March 7, 1967 D. L. MILLER ETAL 3,307,666
ELECTROMAGNETIC TOOTH CLUTCH
Filed Oct. 22, 1965 3 Sheets-Sheet 1

INVENTOR.
Donald L. Miller
Charles A. Mendenhall

WITNESS:
Esther M. Stockton

United States Patent Office 3,307,666
Patented Mar. 7, 1967

3,307,666
ELECTROMAGNETIC TOOTH CLUTCH
Donald L. Miller and Charles A. Mendenhall, Horseheads, N.Y., assignors to The Bendix Corporation, a corporation of Delaware
Filed Oct. 22, 1965, Ser. No. 501,334
12 Claims. (Cl. 192—84)

The present invention relates to an electromagnetic tooth clutch having magnetically-actuated locking means to more positively maintain clutch engagement and thereby increase clutch torque transmitting capability.

In tooth clutch designs wherein the torque transmitting mating clutch teeth are less than a tooth locking angle, a force is developed, tending to separate the clutch teeth. At a given high torque value, this separation force will exceed the clutch holding or engagement force, thus releasing the clutch even though the clutch was not intentionally de-activated. Thus, a maximum torque carrying capacity is imposed on the clutch. This torque capability is further reduced by such factors as eccentricity, parallelism, and vibration of the clutch parts and accentuated at high speed operation.

It is an object of the present invention to provide a tooth clutch design of the electromagnetic type having magnetically operated locking means for increasing clutch torque capability.

It is another object of the present invention to provide an electromagnetic clutch design having a saturable primary armature operative to engage clutch teeth and a secondary armature operative on approach of saturation of the primary armature to provide secondary locking means.

Other objects and advantages of the present invention will become apparent with reference to the accompanying description and drawings wherein.

Figure 1:
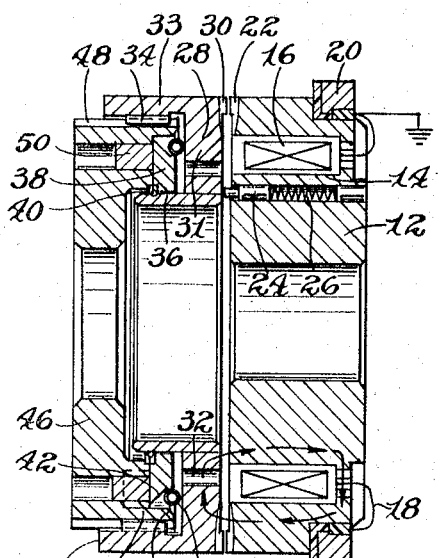
FIGURE 1 is a section view of a first embodiment of our clutch in accordance with teachings of the present invention showing the various parts in a clutch disengaged position.

Referring to FIGURES 1 through 4, there is illustrated a first embodiment of our clutch design which is comprised of a rotatable magnet body or first rotatable torque transmitting member 12 which contains an annular cavity 14 in which there is disposed an annular electromagnetic coil 16 fixed in position by epoxy resin or the like. Coil 16 has an electrical lead 18 connected to slip ring 20 recessed into the outer circumferential surface of the magnet body and adapted to slidably contact a brush connector (not shown) supplying a coil actuating electrical signal and power supply.

On the transverse face of magnet body 12 adjacent the radial outermost edge thereof there is formed an annular ring of first clutch torque transmitting teeth 22. The magnet body structure is completed by a plurality of spring loaded plungers disposed in axially extending bores in the magnet body. One such plunger is illustrated by numeral 24 and has a spring 26.

A second rotatable torque transmitting member, generally designated by numeral 27, is disposed axially adjacent and in close proximity to the first torque transmitting member. The second torque transmitting member includes an annular ring gear or primary armature member 28 having a ring of second clutch torque transmitting teeth 30 formed on a transverse face and aligned for mating engagement with teeth 22.

Primary armature member 28 and magnet body 12 are fabricated from magnetic flux conducting material. Primary armature member 28 has a first portion 31 extending radially inwardly relative to teeth 30 which has high reluctance in the radial direction caused by a plurality of circumferentially formed, non-conducting spaces 32 (FIGURES 1, 2 and 3) which may be either a segmented air gap as illustrated or a discontinuous or continuous ring of non-magnetic flux conducting material such as brass, aluminum, bronze, or the like. In the form illustrated, space 32 is a series of segmented air gaps interrupted by spokes 35. The primary armature has a second portion 33, generally cylindrical, extending axially relative to teeth 30 which has splined teeth 34 formed on its inner diametric surface.

An inner sleeve member 36 formed of non-magnetic flux conducting material is press fitted or otherwise integrally secured to the radial inner edge of the primary armature member forming a carrying surface for the annularly shaped magnetic flux conducting secondary armature member 38. Split ring retainer 40 is fitted in a groove on sleeve 36 to retain secondary armature 38 in its assembled position and limiting the maximum spacing between primary and secondary armatures. The radial outer surface 42 of secondary armature 38 is inclined or obliquely formed and engages a circular ring-shaped garter spring 44 (see FIGURES 1, 2 and 4). The second torque transmitting member 27 is completed by an annular spline adapter plate 46 comprised on non-magnetic flux conducting material and which has spline teeth 48 on its radially outer surface engaging spline teeth 34 of the primary armature to permit relative axial movement while rotationally coupling the spline adapter and primary armature. It will be understood that other equivalent connecting means other than splines may be readily used such as a sliding keyway, pins or bolts or the like. A plurality of permanent magnets 50 are press fitted into the spline adapter 46 adjacent secondary armature 38, providing an attractive force normally holding the secondary armature against the spline adapter and spaced from the primary armature. The spline adapter has an axially extending cylindrical projection 52 at its outer edge extending a spaced distance from the primary armature and which has an oblique ramp surface 54 spaced radially outwardly of the garter spring 44. The second torque transmitting member 27 is thus comprised of primary armature 28, spline adapter 46, sleeve 36, a secondary armature 38 and spring 44 constituting a sub-assembly unit mounted coaxially and adjacent the first torque transmitting member 12.

Operation

The clutch illustrated in FIGURE 1 is shown in the de-energized position with no electrical signal applied to coil 16. The magnet body 12 and spline adapter 46 are adapted to be connected to input and output members such as shafts or the like which it is desired to selectively couple and transmit torque. Thus, there members may be considered for purposes of the description to be axially fixed, but rotational with input and output members. In the de-energized condition, spring loaded plunger 24 biases the primary armature away from the magnet body to establish separation between teeth 22 through 30. The contracting force of garter spring 44 and the attractive force of permanent magnet 50 urge the secondary armature to its maximum spaced distance from the primary armature.

Figure 2:
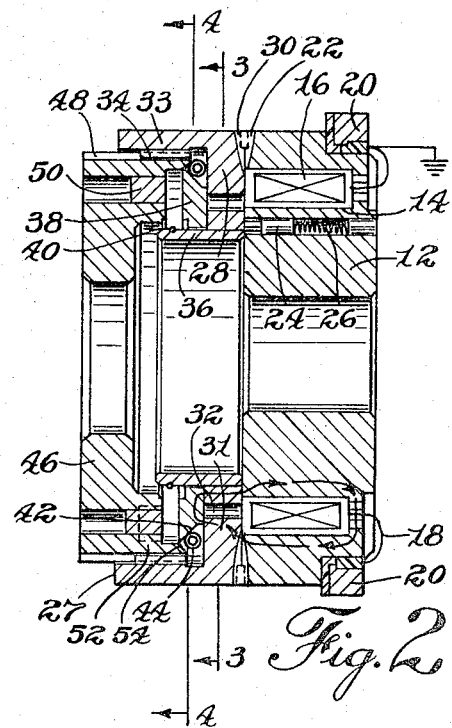
FIGURE 2 is another section view of the first clutch embodiment showing the parts in a clutch engaged position.
Figure 3:
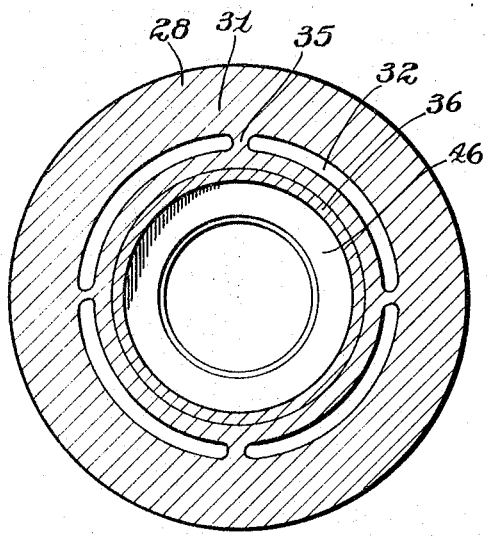
FIGURE 3 is a transverse section view of the first clutch embodiment taken along section line 3—3 of FIGURE 2.
Figure 4:
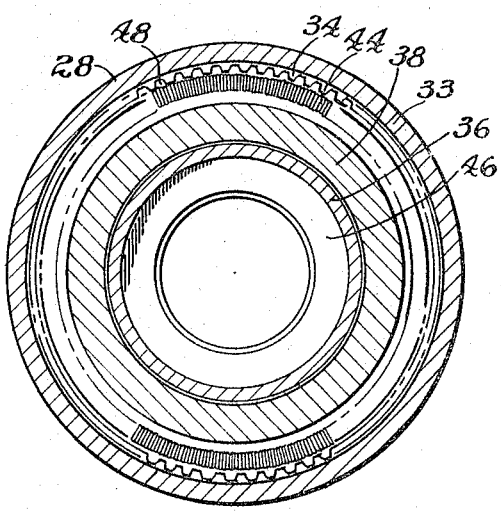
FIGURE 4 is another transverse section view taken along section line 4—4 of FIGURE 2.

On energization of coil 16, the magnetic flux begins to build up following a path or loop generally designated by dashed lines and arrows in the lower half of FIGURE 1. The flux is forced to jump an air gap between magnet body and primary armature and passes generally radially through the primary armature through high reluctance spokes 35, jumping back to the magnet body completing a loop. When the magnet force attracting the primary armature becomes sufficiently high to overcome the force of plunger springs 26 and permanent magnets 50, the primary armature will translate axially, engaging teeth 22 and 30 so that the clutch is able to transmit torque. As the air gap between primary armature and magnet body is closed, a rapid build up of flux density is experienced which approaches saturation of the high reluctance path through spokes 35. The flux strength then becomes sufficient to jump the air gap to secondary armature 38, moving it towards the primary magnet against the bias of garter spring 44. Oblique surface 42 cams spring 44 outwardly, wedging it between surface 54 of the spline adapter and primary armature as illustrated in FIGURE 2. The secondary armature becomes the primary flux conducting path around the high reluctance path forming the flux loop path generally designated in the lower half of FIGURE 2. The angle of the oblique ramp surface 54 can be selected to provide full positive locking or may be modified and less steep angle used for smooth engagement and withdrawal of garter spring 44 while providing a frictional lock.

Figure 5:
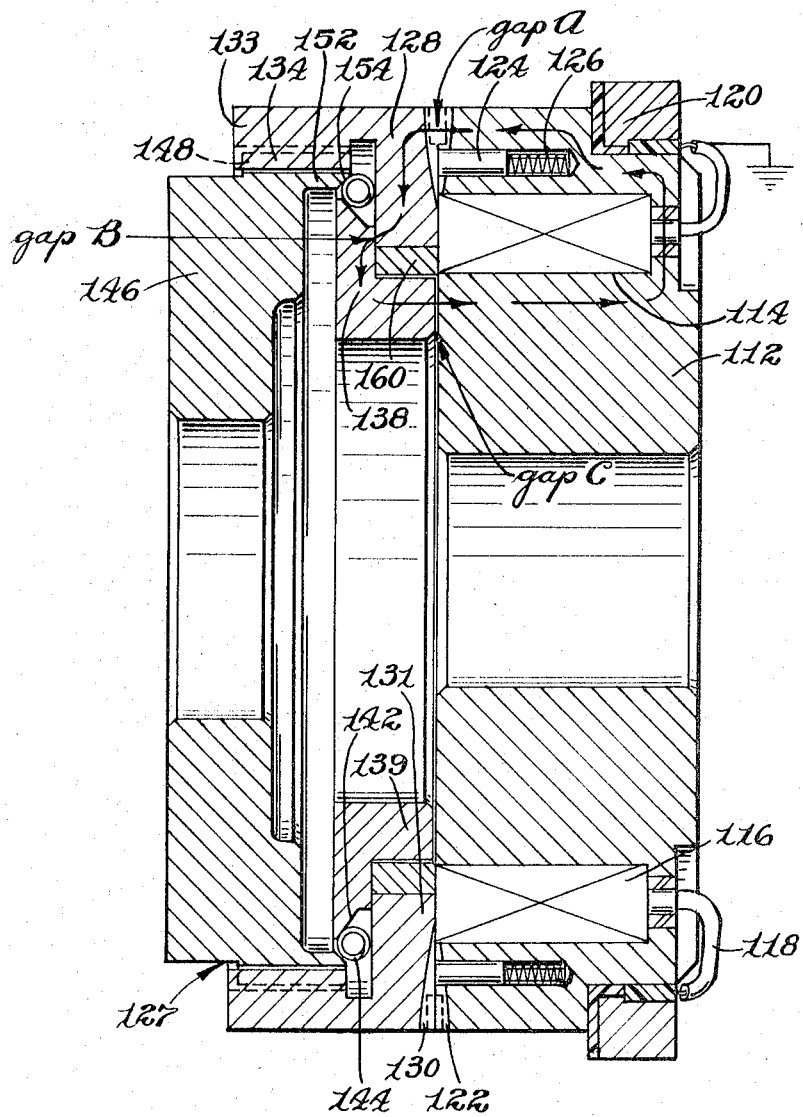
FIGURE 5 is a section view of a second embodiment of our clutch design.
Figure 6:
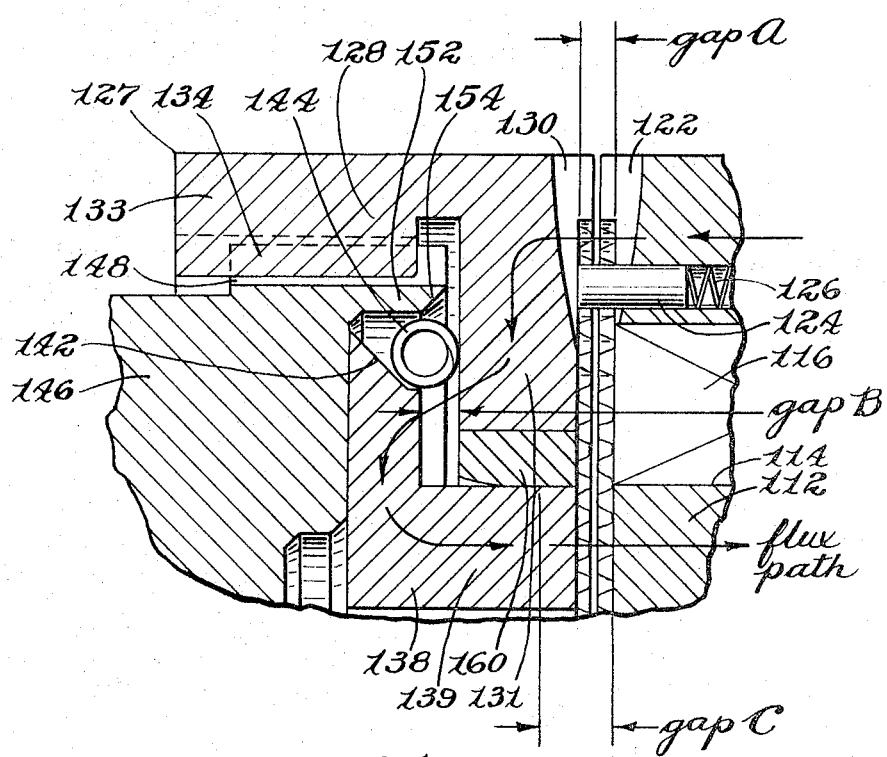
FIGURE 6 is a partial section view of the second embodiment illustrating our clutch in the disengaged position.

Our second embodiment illustrated in FIGURES 5 and 6 contains many parts in common with the first embodiment which bear numerals in the hundred series, the last two digits (tens and ones) of which are identical with those used in FIGURES 1 through 4. The second embodiment is an inexpensive version of our clutch design wherein the permanent magnets 50 and inner sleeve member 36 have been eliminated. The high reluctance or air gap 32 has been replaced with a non-magnetic flux conducting ring 160 formed from brass, bronze, aluminum or the like at the radial inner edge of the primary armature. Secondary armature 138 is modified to have an axially extending projection 139 slidably mounted within circumferentially continuous ring 160. Spring loaded plunger has been relocated radially outwardly of the coil 116.

With the elimination of permanent magnets 50, the contractive force of garter spring 144 alone is relied on to separate primary and secondary armatures. Helper springs, preferably of the washer type, which more conveniently fit the space requirements may be added if desired.

In operation, the initial flux loop is through the magnetic body 112, across air gap A through primary armature 128, across air gap B, through secondary armature 138, across air gap C, and again through the magnet body. When the coil is energized (clutch disengaged prior to energization— FIGURE 6) and the flux increases to a suitable level, primary armature 128, secondary armature 138 and garter spring 144 move in the direction of clutch tooth engagement. The relative positions of the three parts remain essentially the same, except for radial movement of spring 144. As the length of air gaps A and C are shortened, there is a reduction in the total circuit reluctance, increase in magnetic flux and consequent increase in force between all air gaps. Eventually, the force in air gaps B and C is sufficient to overcome the force of garter spring 144, allowing the parts to move to the clutch engaged and locked position as illustrated in FIGURE 6.

The FIGURES 5–6 embodiment, when engaged, provides the same high torque capability as the first embodiment (i.e. double similar capacity clutches without locking means). The second embodiment is significantly more inexpensive to manufacture, but requires slightly more time for clutch engagement due to the high flux build up required to effectively reach the secondary armature through the double air gaps.

While the present invention has been illustrated and described with reference to two specific embodiments, it will be understood that the man skilled in the art may make specific changes without departing from the scope and spirit of the present invention. This invention may be readily applied without the exercise of the invention to electromagnetic clutches of the stationary magnet body type. The garter spring 44 (or 144) may be replaced with caged balls or wedge blocks to provide locking action with separate spring means combined to separate primary and secondary armatures.

We claim:

1. An electromagnetic tooth clutch for selectively coupling rotary members in response to an applied electrical signal comprising:

first and second rotational annular members adapted to be fixed axially relative to one another;

a primary armature member interconnected to said second annular member for rotation therewith, said primary armature having limited axial movement relative to said second annular member;

first and second rings of aligned mutually engageable clutch teeth connected to said first annular member and said primary armature respectively;

electromagnetic coil means selectively energized by an applied electrical signal to move said primary armature axially and engage said first and second rings of clutch teeth;

a secondary armature member axially movable relative to said primary armature member, said secondary armature movable to a locking position on energization of said electromagnetic coil means; and locking means actuated by said secondary armature in its locking position to lock said primary armature in a clutch engaged position.

2. An electromagnetic tooth clutch for selectively coupling rotary members in response to an applied electrical signal comprising:

first and second rotational members adapted to be fixed axially relative to one another;

a primary armature member interconnected to said second annular member for rotation therewith, said primary armature having limited axial movement relative to said second annular member;

first and second rings of aligned mutually-engageable clutch teeth connected to said first annular member and said primary armature respectively;

electromagnetic coil means selectively energized by an applied electrical signal to move said primary armature axially and engage said first and second rings of clutch teeth;

a secondary armature member axially movable relative to said primary armature member, said secondary armature movable to a locking position on energization of said electromagnetic coil means; and locking means actuated by said secondary armature in its locking position to be interposed between said second annular member and said primary armature and wedge said primary armature in a clutch engaged position.

3. An electromagnetic tooth clutch for selectively coupling rotary members in response to an applied electrical signal comprising:

first and second rotational annular members adapted to be fixed axially relative to one another;

a primary armature member interconnected to said second annular member for rotation therewith, said primary armature having limited axial movement relative to said second annular member and having a radially-extending portion with high reluctance in a radial direction and low reluctance in an axial direction;

first and second rings of aligned mutually engageable clutch teeth connected to said first annular member and said primary armature respectively;

electromagnetic coil means selectively energized by an applied electrical signal tending to generate a flux loop through said primary armature resisted by the high reluctance in said radially-extending portion;

a secondary armature member axially movable relative to said primary armature member, said secondary armature movable from a first to a second axial position on energization of said coil means and operative in said second position to establish a by-pass flux path around the high reluctance of said radially-extending portion of the primary armature; and locking means actuated by said secondary armature when in said second position to lock said first and second clutch teeth in an engaged position.

4. An electromagnetic tooth clutch as claimed in claim 3 including first spring means biasing said primary armature in a clutch disengaged position in opposition to said electromagnetic coil means.

5. An electromagnetic tooth clutch as claimed in claim 4 including second spring means biasing said secondary armature away from said primary armature in opposition to said electromagnetic coil means.

6. An electromagnetic tooth clutch as claimed in claim 3 including permanent magnet means mounted in said second annular member operative to hold said secondary armature when said electromagnetic coil is de-energized.

7. An electromagnetic tooth clutch for selectively coupling rotary members in response to an applied electrical signal comprising:

first and second rotational annular members adapted to be fixed axially relative to one another;

a primary armature member interconnected to said second annular member for rotation therewith, said primary armature having limited axial movement relative to said second annular member and having a radially-extending portion with high reluctance in a radial direction and low reluctance in an axial direction;

first and second rings of aligned mutually engageable clutch teeth connected to said first annular member and said primary armature respectively;

electromagnetic coil means selectively energized by an applied electrical signal to move said primary armature axially and engage said first and second rings of clutch teeth;

a secondary armature member disposed intermediate said second annular member and said primary armature having an oblique radially outer surface formed thereon sloping away from said primary armature progressively in a radial increasing direction;

a circular ring-shaped spring member confined between said oblique radially outer surface and said primary armature operative to normally bias said secondary armature away from said primary armature in response to the contractive spring force; and said secondary armature operative on energization of said coil means to displace said circular spring radially outwardly interposing said spring between said second annular member and said primary armature locking said clutch teeth in an engaged position.

8. An electromagnetic tooth clutch as claimed in claim 7 wherein said second annular member has an axially extending projection terminating a spaced distance from said primary armature radially outwardly of the oblique surface formed on said secondary armature, said axially extending projection having an inclined ramp surface at its terminal end for receiving and guiding said circular spring when displaced radially outwardly by said secondary armature.

9. An electromagnetic tooth clutch as claimed in claim 7 wherein said flux non-conducting segmented gaps are air gaps.

10. An electromagnetic tooth clutch as claimed in claim 7 wherein the interconnection between second annular member and said primary armature is a spline connection operative to permit relative axial motion.

11. An electromagnetic tooth clutch as claimed in claim 7 including an inner non-flux conducting ring member secured to the radially inner edge of said primary armature and extending axially therefrom to provide a sliding cylindrical surface for said secondary armature.

12. An electromagnetic tooth clutch for selectively coupling rotary members in response to an applied electrical signal comprising:

first and second rotational annular members adapted to be fixed axially relative to one another;

a primary armature member interconnected to said second annular member for rotation therewith, said primary armature having limited axial movement relative to said second annular member and having a radially extending portion with a circumferential ring of segmented flux non-conducting gaps, said ring segmented by flux conducting spokes forming a high reluctance path in said radially extending portion;

first and second rings of aligned mutually engageable clutch teeth connected to said first annular member and said primary armature respectively;

electromagnetic coil means selectively energized by an applied electrical signal to move said primary armature axially and engage said first and second rings of clutch teeth;

a secondary armature member disposed intermediate said second annular member and said primary armature having an oblique radially outer surface formed thereon sloping away from said primary armature progressively in a radial increasing direction;

a circular ring-shaped spring member confined between said oblique radially outer surface and said primary armature operative to normally bias said secondary armature away from said primary armature in response to the contractive spring force;

said secondary armature operative on energization of said coil means to displace said circular spring radially outwardly interposing said spring between said second annular member and said primary armature locking said clutch teeth in an engaged position; and said secondary armature further operative on coil energization to abut said primary armature and provide a by-pass flux path around said non-conducting segmented gaps.

References Cited by the Examiner

UNITED STATES PATENTS 2,698,679   1/1955   Vernhes _____ 192—84
3,093,227   6/1963   Straub et al. _____ 192—84

DAVID J. WILLIAMOWSKY, *Primary Examiner.*

A. T. McKEON, *Assistant Examiner.*